United States Patent
Sly et al.

(10) Patent No.: US 11,016,114 B1
(45) Date of Patent: May 25, 2021

(54) DETERMINING AIRCRAFT FLYING CONDITIONS BASED ON ACOUSTIC SIGNALS CAUSED BY AIRFLOW

(71) Applicant: Rosemount Aerospace Inc., Burnsville, MN (US)

(72) Inventors: Jaime Sly, Savage, MN (US); Joshua Boelman, Farmington, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 16/787,833

(22) Filed: Feb. 11, 2020

(51) Int. Cl.
*B64D 43/02* (2006.01)
*G01P 5/24* (2006.01)
*G01C 5/00* (2006.01)

(52) U.S. Cl.
CPC .............. *G01P 5/245* (2013.01); *B64D 43/02* (2013.01); *G01C 5/005* (2013.01)

(58) Field of Classification Search
CPC .......... G01P 5/245; B64D 43/02; G01C 5/005
See application file for complete search history.

(56) References Cited

U.S. PATENT DOCUMENTS

| | | | | |
|---|---|---|---|---|
| 4,286,462 A | * | 9/1981 | Bourne | G01S 15/885 73/170.13 |
| 4,302,827 A | * | 11/1981 | Rosenblum | G01S 15/88 340/964 |
| 5,260,702 A | * | 11/1993 | Thompson | G01C 5/005 244/180 |
| 6,396,770 B1 | * | 5/2002 | Carey | G10K 15/046 367/141 |
| 7,343,793 B2 | * | 3/2008 | Tillotson | G01N 29/024 73/170.01 |
| 9,021,856 B2 | * | 5/2015 | Leblond | G01P 21/025 73/1.29 |
| 9,121,860 B1 | * | 9/2015 | Cronyn | G01P 5/245 |
| 9,233,763 B1 | * | 1/2016 | Chen | G07C 5/0841 |
| 9,612,252 B2 | * | 4/2017 | Waddington | G01P 5/24 |
| 10,101,443 B1 | * | 10/2018 | LeGrand, III | B64D 43/02 |
| 2007/0107510 A1 | * | 5/2007 | Agami | G01K 13/028 73/182 |
| 2010/0186497 A1 | * | 7/2010 | Choisnet | G01P 5/245 73/170.13 |
| 2012/0173191 A1 | * | 7/2012 | Moeller | G01P 5/22 702/142 |
| 2015/0263762 A1 | * | 9/2015 | Shen | H04L 1/0045 701/3 |
| 2016/0305977 A1 | * | 10/2016 | Genevrier | G01S 7/4813 |
| 2017/0225781 A1 | * | 8/2017 | Almasoud | G08G 5/0069 |
| 2017/0291722 A1 | * | 10/2017 | Owens | G07C 5/0808 |
| 2017/0356303 A1 | * | 12/2017 | Hodge | G01P 5/245 |

(Continued)

*Primary Examiner* — Jamel E Williams
(74) *Attorney, Agent, or Firm* — Kinney & Lange, P.A.

(57) ABSTRACT

Apparatus and associated methods relate to determining airspeed and/or altitude based on acoustic waves caused by airflow. One of more acoustic transducers are positioned along an exterior surface of an aircraft. Each of the one or more acoustic transducers is configured to detect acoustic waves caused by the airflow. The acoustic waves detected are indicative of an airstream condition proximate the acoustic transducer, such as, for example, airspeed and/or altitude. A processor is configured to determine airspeed and/or altitude of the aircraft based, at least in part, on the acoustic waves detected.

20 Claims, 5 Drawing Sheets

(56) References Cited

U.S. PATENT DOCUMENTS

| | | | | |
|---|---|---|---|---|
| 2018/0164337 A1* | 6/2018 | Naslund | ............... | G01P 5/14 |
| 2018/0354647 A1* | 12/2018 | North | ............... | G07C 5/008 |
| 2018/0356372 A1* | 12/2018 | Berenbaum | ......... | G01N 29/228 |
| 2019/0346279 A1 | 11/2019 | Sly et al. | | |
| 2020/0057092 A1* | 2/2020 | Ell | ............... | G01K 11/24 |

\* cited by examiner

DETERMINING AIRCRAFT FLYING CONDITIONS BASED ON ACOUSTIC SIGNALS CAUSED BY AIRFLOW

BACKGROUND

Various flight metrics are provided to a pilot during operation of an aircraft. These various metrics provide to the pilot information that is helpful to perform safe operation of the aircraft. These flight metrics include airspeed, altitude, angle of attack, angle of sideslip, pitch, roll, yaw, as well as many others. Some of these flight metrics have been traditionally measured by pneumatic air data sensors, such as Pitot tubes. When flying through certain atmospheric conditions, these pneumatic air data sensors can accrete water, ice, or other foreign objects, which can deleteriously affect operation. Thus, it would be helpful to provide these flight metrics in a redundant fashion using dissimilar technologies that are not subject to these same failure mechanisms and to provide backup measurement capability in the event of total failure of a primary measurement system.

SUMMARY

Apparatus and associated methods relate to a system for determining airspeed and/or altitude of an aircraft. The system includes one or more acoustic transducers positioned along an exterior surface of the aircraft. Each of the one or more acoustic transducers is configured to detect acoustic waves caused by airflow relative to the exterior surface. The acoustic waves detected are indicative of an airstream condition proximate the acoustic transducer. The system includes a processor configured to determine airspeed and/or altitude of the aircraft based, at least in part, on the acoustic waves detected.

Some embodiments relate to a method for determining airspeed and/or altitude of an aircraft. The method includes detecting, via one of more acoustic transducers positioned along an exterior surface of an aircraft, acoustic waves caused by airflow relative to the exterior surface of the aircraft. The method also includes determining, via a processor, airspeed and/or altitude of the aircraft based, at least in part, on the acoustic waves detected.

DETAILED DESCRIPTION

Apparatus and associated methods relate to determining airspeed and/or altitude based on acoustic waves caused by airflow. One of more acoustic transducers are positioned along an exterior surface of an aircraft. Each of the one or more acoustic transducers is configured to detect acoustic waves caused by the airflow. The acoustic waves detected are indicative of an airstream condition proximate the acoustic transducer, such as, for example, airspeed and/or altitude. A processor is configured to determine airspeed and/or altitude of the aircraft based, at least in part, on the acoustic waves detected.

Figure 1:
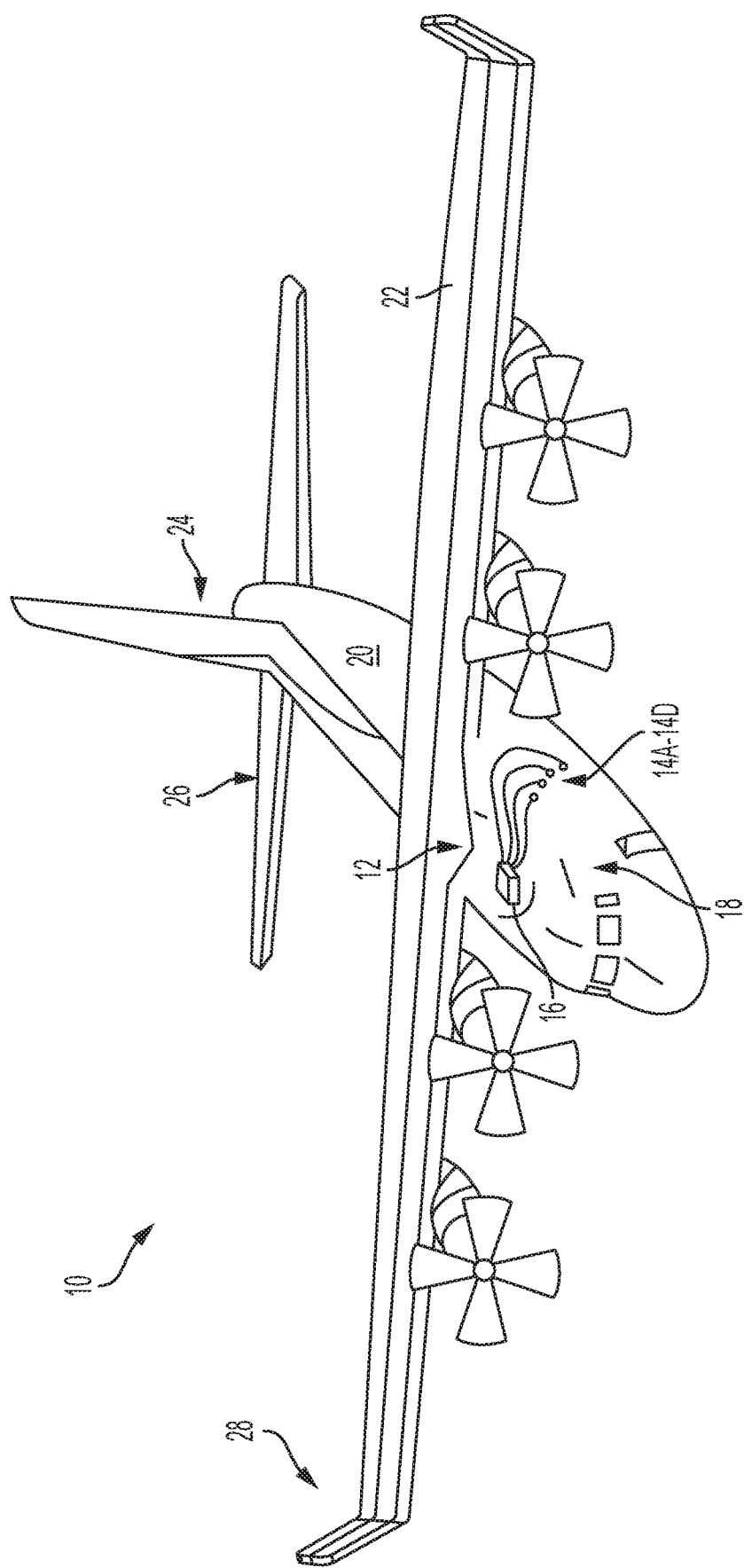
FIG. 1 is a schematic view of an aircraft equipped with a system for determining aircraft flying conditions based on acoustic signals caused by airflow.

FIG. 1 is a schematic view of an aircraft equipped with a system for determining aircraft flying conditions based on acoustic signals caused by airflow. In FIG. 1, aircraft 10 includes system 12 for determining aircraft flying conditions based on acoustic signals. System 12 includes acoustic transducers 14A-14D and controller 16. Acoustic transducers 14A-14D are mounted to exterior surface 18 of aircraft 10. Each of acoustic transducers 14A-14D is configured to detect acoustic waves caused by the airflow. As the airflow passes over each of the acoustic transducers, acoustic characteristics of (e.g., acoustic waves caused by) the airflow are detected by the acoustic transducers 14A-14D.

These acoustic waves (e.g., acoustic characteristic) detected are indicative of or intrinsic to an airstream condition proximate the acoustic transducer. Such airstream conditions include altitude and airspeed, for example. As the altitude increases, both the temperature and the density of the air decreases, causing the magnitude of the acoustic waves to decrease in certain frequency ranges. Thus, these acoustic waves are indicative of altitude. Also, as the airspeed increases, the magnitude of the acoustic waves in the boundary layer near the exterior surface of the aircraft increases in certain frequency ranges. Thus, these acoustic waves are indicative of airspeed. In general, both the temperature and variations in airstream velocity affect the acoustic waves detected.

Controller 16 is in electrical communication with each of acoustic transducers 14A-14D. Controller 16 is configured to receive, from each of acoustic transducers 14A-14D, a signal indicative of an acoustic wave detected thereby (e.g., acoustic properties of the airflow over acoustic transducers 14A-14D). Controller 16 is further configured to determine altitude and/or airspeed indicated by the acoustic waves detected and as indicated by the signal received.

Only one acoustic transducer is needed for detecting the acoustic waves so as to determine airspeed and/or altitude. Thus, some embodiments will include only one acoustic transducer, such as, for example acoustic transducer 14A. In the depicted embodiment, acoustic transducers 14A-14D are mounted on fuselage 20 of aircraft 10. In other embodiments, acoustic transducers 14A-14D can be mounted at in various other locations, such as, for example, on an exterior surface of wing 22, vertical stabilizer 24, horizontal stabilizer 26, winglet 28, etc. of aircraft 10.

System 12 can be configured in various manners so as to determine airspeed and/or altitude of aircraft 10. In the embodiment depicted in FIG. 1, system 12 is a passive air data sensing system, which is configured to determine airspeed and/or altitude of aircraft 10 based, at least in part, on the detected acoustic waves caused by the airflow. System 12 can be in communication with other air data sensing systems of aircraft 10. These other air data sensing systems can provide system 12 with signals indicative of various air data metrics and/or flight metrics, which can be used by system 12 in conjunction with the acoustic waves detected for determination of airspeed and/or altitude of aircraft 10. Calibration of system 12 can be performed so as to accommodate acoustic variations resulting from the local airflow variations that occur at different locations of the aircraft.

In some embodiments, determination of altitude and/or airspeed of aircraft 10 using the detected acoustic waves that are caused by airflow can be a secondary or backup method of determining altitude and/or airspeed. In these embodiments, system 12 can be used to determine airspeed and/or altitude in response to failure of a primary air data sensing system. Such primary air data sensing systems can be a pneumatic air data sensing system (e.g., a pitot-static probe), a laser air data sensing system, or an active acoustic air data sensing system, for example. The primary air data sensing system need not be located adjacent to system 10. In some embodiments, however, system 10 can be part of a primary air data sensing system, as will be described next.

Regardless of whether system 12 is part of a primary air data sensing system or simply in communication with a primary air data sensing system, system 12 can be configured to receive signals indicative of various air data metrics from the primary air data sensing system. These received signals can be used in conjunction with the acoustic waves detected by acoustic transducers 14A-14D to determine altitude and/or airspeed. In one embodiment, a pneumatic air data sensing system can be configured to determine airspeed of aircraft 10, for example. This airspeed determined can then be used in conjunction with the acoustic waves caused by the airflow, which are detected by acoustic transducers 14A-14D, to determine altitude of aircraft 10. In another embodiment, the pneumatic air data sensing system can be configured to determine altitude of aircraft 10. This altitude determined can then be used in conjunction with the acoustic waves caused by the airflow, which are detected by acoustic transducers 14A-14D, to determine airspeed of aircraft 10.

In some embodiments, such a secondary method (e.g., passive detection of acoustic waves) of determining altitude and/or airspeed can be performed by acoustic transducers 14A-14D that are part of an active acoustic air data sensing system. In these embodiments, system 12 can include an ultrasonic emitter, which is also mounted to the exterior surface of the aircraft. The ultrasonic emitted can be configured to emit an ultrasonic signal into the airstream adjacent to the ultrasonic emitter. The ultrasonic emitter can be mounted in a location proximate that of acoustic transducers 14A-14D, such that acoustic transducers 14A-14D are capable of detecting the ultrasonic signal emitted by the ultrasonic emitter. Such a system that includes an ultrasonic emitter can be configured to provide additional capabilities. For example, ultrasonic emitter can be used in conjunction with acoustic transducers 14A-14D in a primary manner to determine airspeed, speed of sound, altitude, airstream direction, etc. of aircraft 10. One or more of acoustic transducers 14A-14D can also provide backup or secondary capability of determining airspeed and/or altitude in a passive manner (e.g., without using the ultrasonic emitter).

Figure 2:
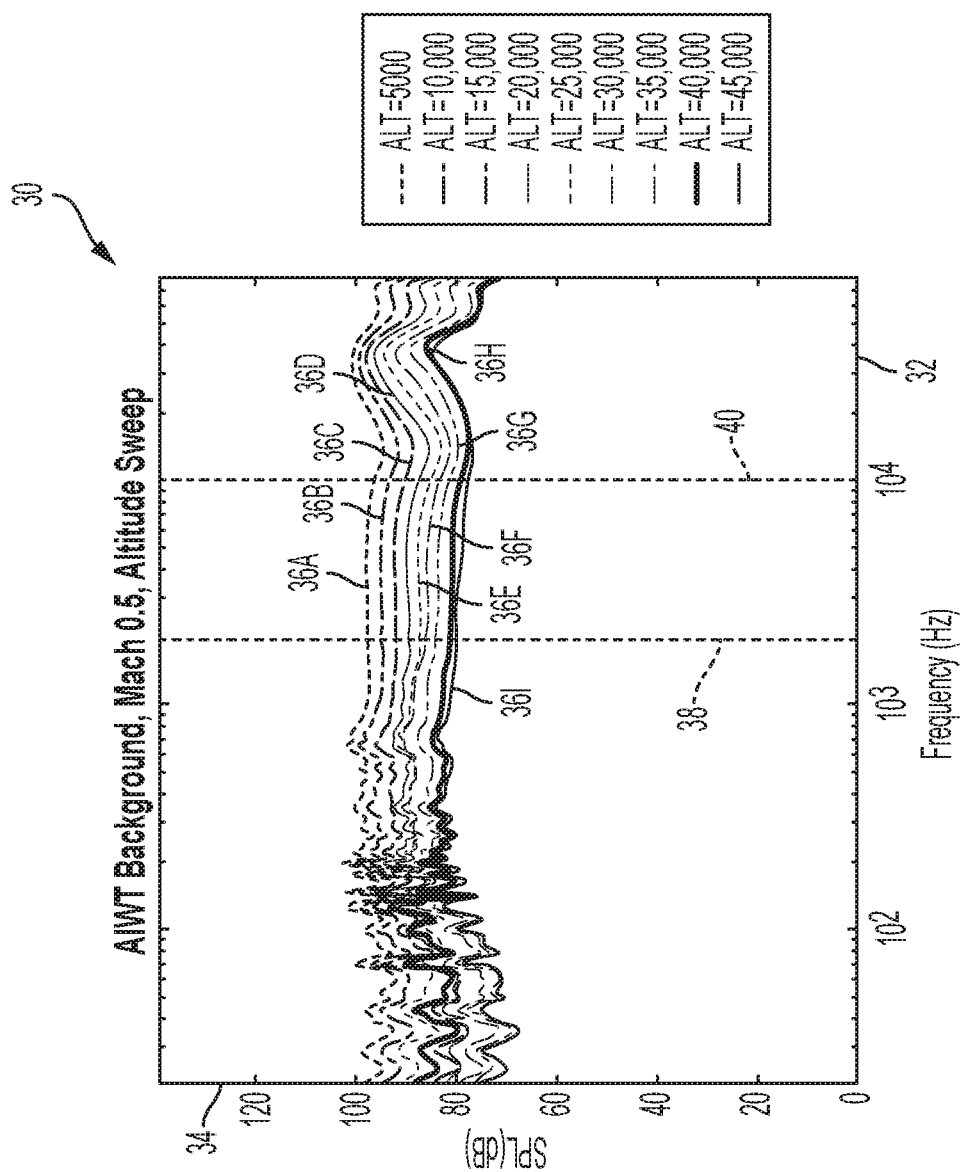
FIG. 2 is a graph depicting magnitude/frequency relations of acoustic waves detected at various flight altitudes.

FIG. 2 is a graph depicting magnitude/frequency relations of acoustic waves detected at various flight altitudes. In FIG. 2, graph 30 includes horizontal axis 32, vertical axis 34 and acoustic-magnitude/frequency relations 36A-36I. Horizontal axis 32 is indicative of frequency of acoustic waves detected, and vertical axis 34 is indicative of magnitude of acoustic waves detected. Acoustic-magnitude/frequency relations 36A-36I depict the relation between the magnitude and frequency of acoustic waves detected by acoustic transducers 14A-14D (depicted in FIG. 1). Acoustic-magnitude/frequency relations 36A-36I correspond to acoustic waves detected when aircraft 10 (depicted in FIG. 1) is flying at altitudes of 5, 10, 15, 20, 25, 30, 35, 40, and 45 thousand feet above sea level, respectively. Each of acoustic-magnitude/frequency relations 36A-36I were detected using a wind tunnel simulating aircraft 10 flying at an airspeed of 0.5 mach.

Between the frequencies of 20 kHz and 100 kHz, the acoustic waves detected, as indicated by acoustic-magnitude/frequency relations 36A-36I, are substantially constant (e.g., independent of frequency). Within these lower 38 and upper 40 frequency bounds (corresponding to 20 and 100 kHz, respectively), the acoustic waves detected are indicative of altitude of aircraft 10, which is flying at an airspeed of 0.5 mach. Similar graphs can be constructed that depict acoustic-magnitude/frequency relations of acoustic waves detected when aircraft 10 is flying at other airspeeds. Thus, knowing the aircraft's airspeed and the magnitude of the acoustic waves detected within these frequency bounds, the altitude of aircraft 10 can be determined.

The airspeed of aircraft 10 can be known by various manners. For example, a pneumatic air data sensor or a laser air data sensor can determine the airspeed of aircraft 10. Controller 16 of system 10 can then receive from the pneumatic air data sensor, a signal indicative of airspeed. Controller 16 can then determine altitude of aircraft 10 based on the received signal and on the acoustic waves detected by acoustic transducers 14A-14D. Controller 16 of aircraft 10 can perform, for example, a Fast Fourier Transform (FFT) of an acoustic wave detected by acoustic transducers 14A-14D. Controller 16 can the select one or more of the data points of the FFT corresponding to the frequency range that indicates altitude of aircraft 10 (e.g., between 20 and 100 kHz in the depicted graph).

Figure 3:
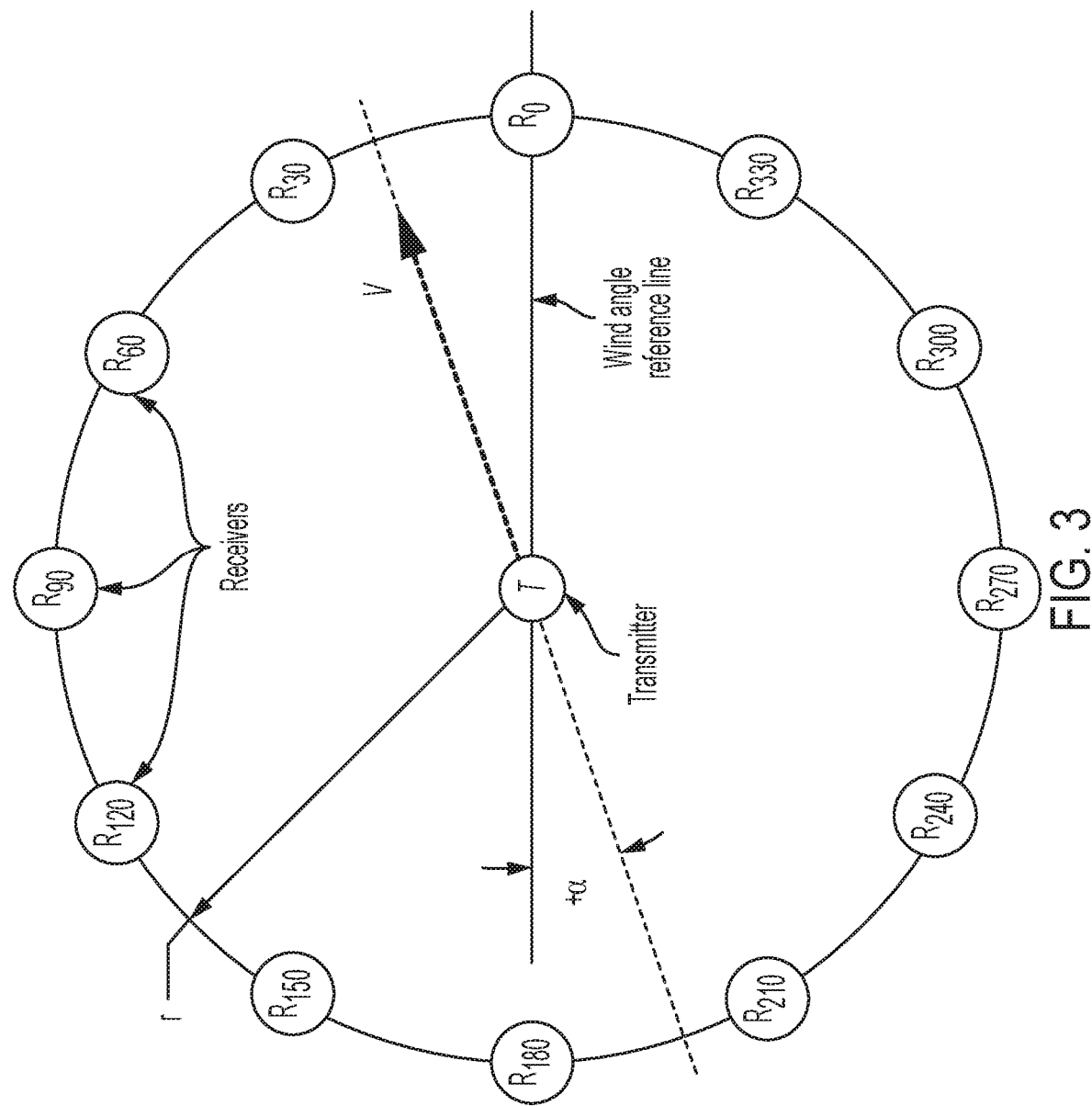
FIG. 3 shows a schematic view of a configuration of an active ultrasonic air data sensing system for determining aircraft flying conditions.

In some embodiments, an ultrasonic emitter can be used in conjunction with acoustic transducers 14A-14D to determine airspeed. FIG. 3 shows a schematic view of a configuration of an active ultrasonic air data sensing system for determining aircraft flying conditions. The active ultrasonic air data sensing system differs from the air data sensing system depicted in FIG. 1, in that the active system includes an acoustic emitter or transmitter. In FIG. 3, acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ (a.k.a. acoustic detectors) are configured in a circular pattern about ultrasonic emitter T (a.k.a an acoustic transmitter). The flight metric detection system, to which acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ and ultrasonic emitter T belong, can be used both passively as described above with reference to the embodiment depicted in FIG. 1, and actively as will be described below. Although acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ are depicted as being distributed every 30 degrees about a circle, various other configurations can be used.

In the passive mode, acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ can be configured to detect acoustic waves cause by airflow proximate their locations on exterior surface 18. In the active mode, ultrasonic emitter T can be configured to emit an ultrasonic pulse into the airstream proximate ultrasonic emitter T. The ultrasonic pulse emitted will be carried in all direction from ultrasonic emitter T so as to be detectable by acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$. Various airflow metrics can be determined based on relative amplitudes and/or times or arrival of the acoustic wave detected by acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$.

In active mode, ultrasonic emitter T emits an ultrasonic pulse into the airstream proximate ultrasonic emitter T. Acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ detect the ultrasonic pulse emitted into the airstream at various times subsequent to the emission based on times of flight to the locations at which acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ are mounted. These times of flight determined from the times of that the ultrasonic pulse is detected by acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ can be used to determine a direction of the airstream flowing past acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$.

Ultrasonic transmitter T can be a piezoelectric speaker, cone speaker, microelectro-mechanical systems (MEMS) speaker, or other electric-to-acoustic transducer. Acoustic transducers can be microphones including MEMS microphones, condenser microphones, lasers, or other acoustic-to-electric transducer.

Depending on the orientation of the surface, upon which the active ultrasonic air data sensing system depicted in FIG. 3 is located, angle of attack (AOA) and/or angle of slip (AOS) can be determined using the active ultrasonic air data sensing system as will be described below. Airspeed can also be determined based on acoustic wave propagation rates to acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$.

The time-of-flight ($\tau$) of an acoustic pulse emitted by ultrasonic transmitter T can be measured to each of acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$. The time-of-flight of the acoustic pulse from ultrasonic transmitter T to each $R_\theta$ of acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ placed at angle $\theta$ is given by:

$$\tau_\theta = \frac{r}{c_0 + |v|\cos(\theta - \alpha)}, \quad (1)$$

where $c_0$ is the speed of sound, $\alpha$ is angle-of-attack, and v is the airspeed of airflow.

As shown in equation (1), time-of-flight is impacted by the airspeed and wind angle. The radius r is constant where acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ are positioned at fixed radii and angles from ultrasonic transmitter T. The speed of sound in air is not impacted by wind angle or airspeed. Therefore, for a known airspeed, the only variable impacting the time-of-flight of the acoustic pulse to acoustic transducers $R_0$, $R_{30}$, $R_{60}$, $R_{90}$, $R_{120}$, $R_{150}$, $R_{180}$, $R_{210}$, $R_{240}$, $R_{270}$, $R_{300}$, and $R_{330}$ is wind angle.

The speed of sound can be determined by an acoustic transducer aligned ($\theta=\theta_0$) transverse (i.e., at 90 degrees or orthogonal) with respect to the wind direction as follows:

$$c_0 = \frac{r}{\tau_{\theta_0}}. \quad (2)$$

The difference in time-of-flight ($\Delta$) between opposing acoustic receivers $R_\theta$ and ($R_\theta + 180°$) given by:

$$\Delta\tau_\theta = \tau_\theta - \tau_{\theta+180°}. \quad (3)$$

From these measurements of $\Delta\tau_\theta$, the angle of wind direction can be determined, as the $\Delta\tau_\theta = 0$ when $\theta$ is transverse to the wind direction.

Figure 4:
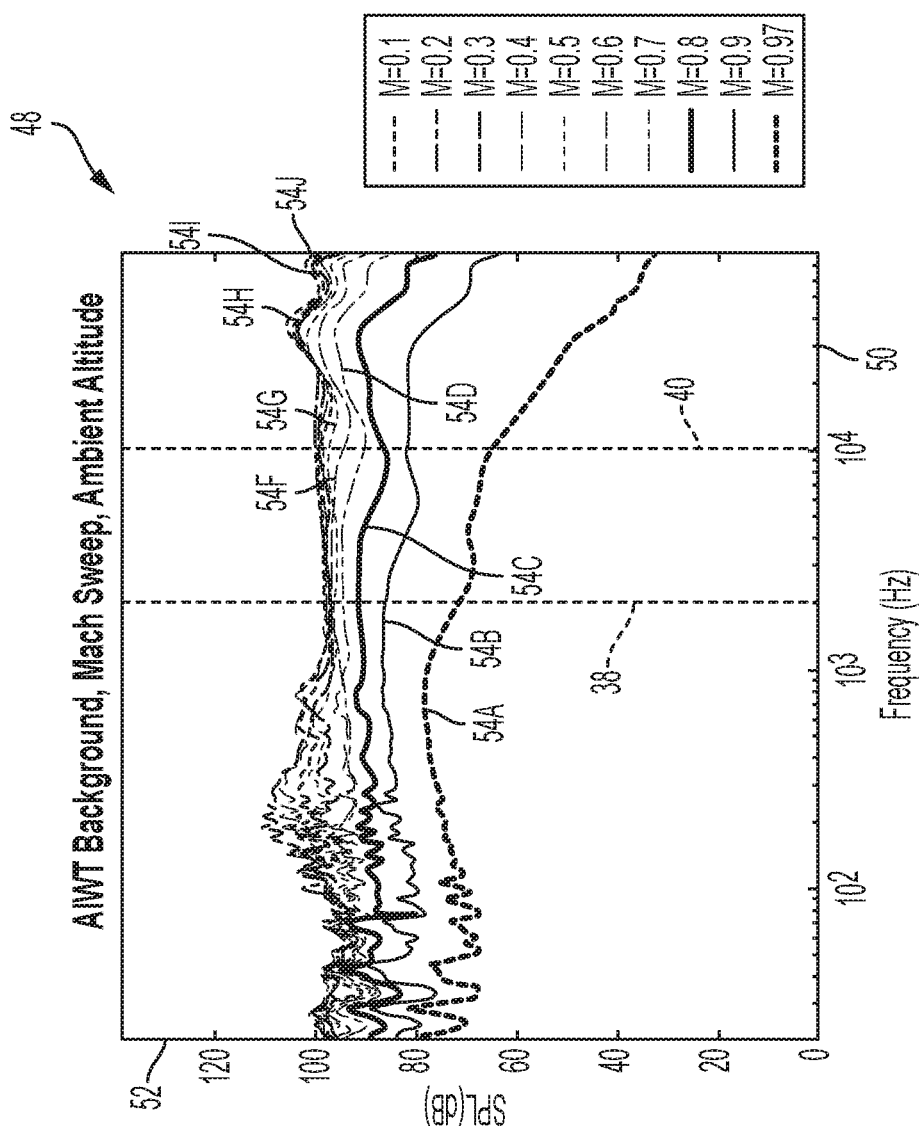
FIG. 4 is a graph depicting magnitude/frequency relations of acoustic waves detected at various airspeeds.

FIG. 4 is a graph depicting magnitude/frequency relations of acoustic waves detected at various airspeeds. In FIG. 4, graph 48 includes horizontal axis 50, vertical axis 52 and acoustic-magnitude/frequency relations 54A-54J. Horizontal axis 50 is indicative of frequency of acoustic waves detected, and vertical axis 52 is indicative of magnitude of acoustic waves detected. Acoustic-magnitude/frequency relations 54A-54J depict the relation between the magnitude and frequency of acoustic waves detected by acoustic transducers 14A-14D (depicted in FIG. 1). Acoustic-magnitude/frequency relations 54A-54J correspond to acoustic waves detected when aircraft 10 (depicted in FIG. 1) is flying at airspeeds of 0.1, 0.2, 0.3, 0.4, 0.5, 0.6, 0.7, 0.8, 0.9, and 0.97 Mach, respectively. Each of acoustic-magnitude/frequency relations 54A-54J were detected in a wind tunnel replicating aircraft 10 flying at an altitude of approximately 1000 feet above sea level.

Between the frequencies of 20 kHz and 100 kHz, the acoustic waves detected, as indicated by acoustic-magnitude/frequency relations 54A-54J, are substantially separated from one another. Within these lower 38 and upper 40 frequency bounds (corresponding to 20 and 100 kHz, respectively), the acoustic waves detected are indicative of airspeed of aircraft 10, which is flying at an altitude of approximately 1000 feet above sea level. Similar graphs can be constructed that depict acoustic-magnitude/frequency relations of acoustic waves detected when aircraft 10 is flying at other altitudes. Thus, knowing the aircraft's altitude and the magnitude of the acoustic waves detected within these frequency bounds, the altitude of aircraft 10 can be determined.

The altitude of aircraft 10 can be known by various manners. For example, a pneumatic air data sensor can determine the altitude of aircraft 10. Controller 16 of system 10 can then receive from the pneumatic air data sensor, a signal indicative of altitude. Controller 16 can then determine airspeed based on the received signal and on the acoustic waves detected by acoustic transducers 14A-14D. Controller 16 of aircraft 10 can perform, for example, a Fast Fourier Transform (FFT) of an acoustic wave detected by acoustic transducers 14A-14D. Controller 14 can the select one or more of the data points of the FFT corresponding to the frequency range that indicates airspeed of aircraft 10 (e.g., between 20 and 100 kHz in the depicted graph).

Figure 5:
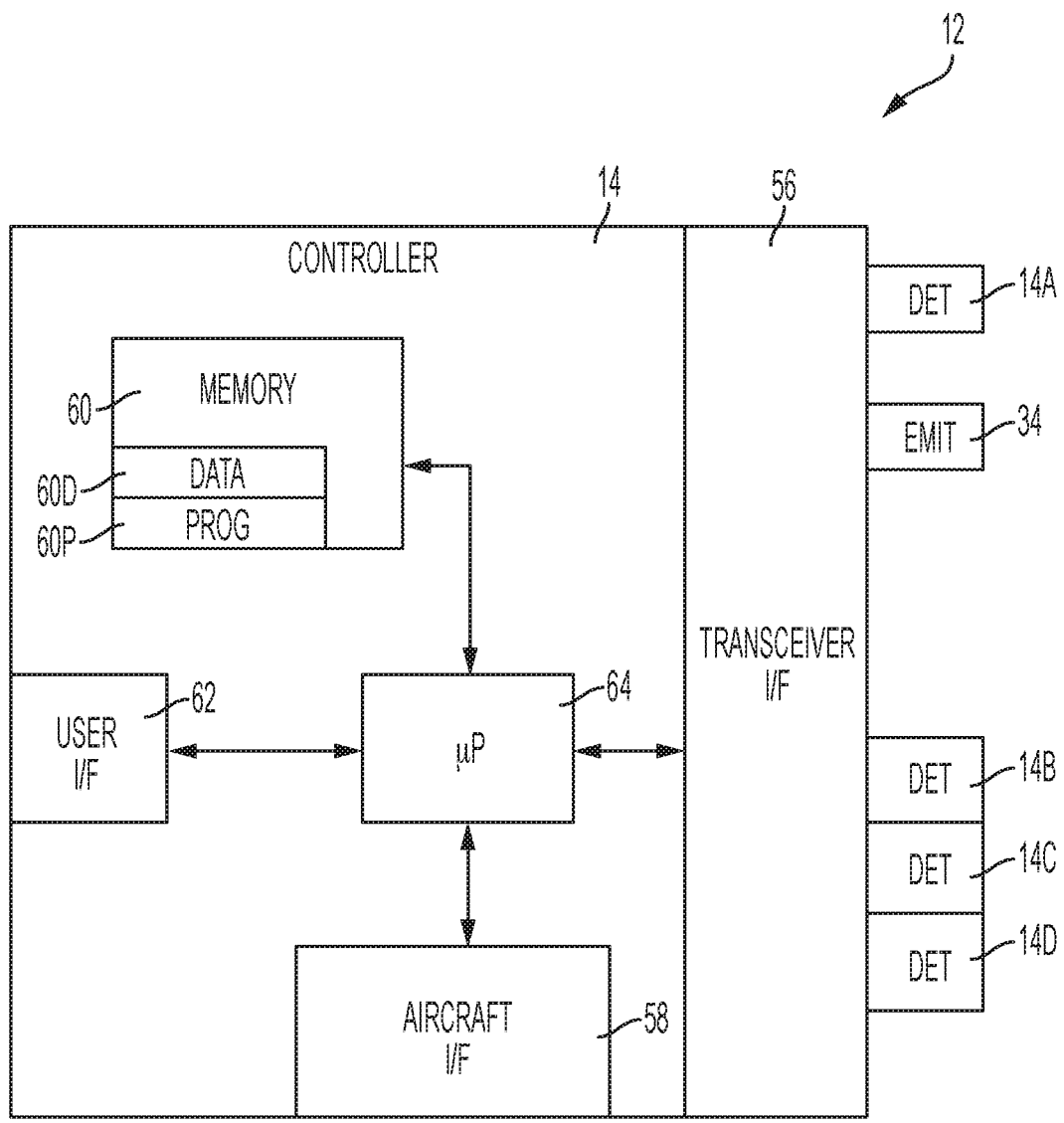
FIG. 5 is a block diagram of a system for determining aircraft flying conditions based on acoustic signals caused by airflow.

FIG. 5 is a block diagram of a system for determining aircraft flying conditions based on acoustic signals caused by airflow. In FIG. 5, system 12 for determining airspeed and/or altitude of an aircraft based on acoustic signals caused by airflow includes upstream acoustic transducer 14A, ultrasonic emitter 34, downstream acoustic transducers 14B-14D, and controller 14. Controller 14 includes sensor interface 56, aircraft interface 58, storage device(s) 60, and user interface 62 and processor 64. Processor 64 can receive program instructions 60P from storage device(s) 60. Processor 64 can be configured to calculate altitude and/or airspeed, based on signals received from and generated by upstream and/or downstream acoustic transducers 14A and 14B-14D, respectively, using program instructions 60P retrieved from storage device(s) 60. For example, processor 64 can be configured to receive signals, via sensor interface 56, indicative of ultrasonic pulse detected.

As illustrated in FIG. 5, system 12 includes upstream acoustic transducer 14A, ultrasonic emitter 34, downstream acoustic transducers 14B-14D, and controller 14. However, in certain examples, acoustic turbulence-detection system 12 can include more or fewer components. For instance, in some embodiments, system 12 can include additional ultrasonic emitters and/or acoustic transducers. In other embodiments, system 12 can include no ultrasonic emitter. In some embodiments, system 12 can include pneumatic air data sensors. In some examples, system 12 can be performed in one of various aircraft computational systems, such as, for example, an existing Full Authority Digital Engine Controller (FADEC) of the aircraft.

Processor 64, in one example, is configured to implement functionality and/or process instructions for execution within acoustic turbulence-detection system 12. For instance, processor 64 can be capable of processing instructions stored in storage device(s) 60. Examples of processor 64 can include any one or more of a microprocessor, a controller, a digital signal processor(s) (DSP), an application specific integrated circuit (ASIC), a field-programmable gate array (FPGA), or other equivalent discrete or integrated logic circuitry. Processor 64 can be configured to determine various airstream conditions.

Storage device(s) 60 can be configured to store information within acoustic turbulence-detection system 12 during operation. Storage device(s) 60, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 60 is a temporary memory, meaning that a primary purpose of storage device(s) 60 is not long-term storage. Storage device(s) 60, in some examples, is described as volatile memory, meaning that storage device(s) 60 do not maintain stored contents when power to system 12 is turned off. Examples of volatile memories can include random access memories (RAM), dynamic random access memories (DRAM), static random access memories (SRAM), and other forms of volatile memories. In some examples, storage device(s) 60 is used to store program instructions for execution by processor 64. Storage device(s) 60, in one example, is used by software or applications running on system 12 (e.g., a software program determining altitude and/or airspeed).

Storage device(s) 60, in some examples, can also include one or more computer-readable storage media. Storage device(s) 60 can be configured to store larger amounts of information than volatile memory. Storage device(s) 60 can further be configured for long-term storage of information. In some examples, storage device(s) 60 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 58 can be used to communicate information between system 12 and an aircraft. In some embodiments, such information can include aircraft conditions, flying conditions, and/or atmospheric conditions. In some embodiments, such information can include data processed by system 12, such as, for example, alert signals. Aircraft interface 58 can also include a communications module. Aircraft interface 58, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User interface 62 can be used to communicate information between system 12 and a user. In some embodiments, such information can include aircraft conditions, flying conditions, and/or atmospheric conditions. In some embodiments, such information can include data processed by system 12, such as, for example, alert signals. User interface 62 can also include a communications module. User interface 62 can include various input devices, such as, for example, a keyboard, a mouse, a touch sensitive screen, etc. User interface 62 can include various output devices, such as, for example, a display screen, indicator lamps, audio devices, etc.

Discussion of Possible Embodiments

The following are non-exclusive descriptions of possible embodiments of the present invention.

Apparatus and associated methods relate to a system for determining airspeed and/or altitude of an aircraft. The system includes one or more acoustic transducers positioned along an exterior surface of the aircraft. Each of the one or more acoustic transducers is configured to detect acoustic waves caused by airflow relative to the exterior surface. The acoustic waves detected are indicative of an airstream condition proximate the acoustic transducer. The system includes a processor configured to determine airspeed and/or altitude of the aircraft based, at least in part, on the acoustic waves detected.

The system of the preceding paragraph can optionally include, additionally and/or alternatively, any one or more of the following features, configurations and/or additional components:

A further embodiment of the foregoing system, wherein the processor can be further configured to receive a signal indicative of airspeed from an airspeed sensor in communication with the processor, and to determine altitude based on the acoustic waves detected and on the airspeed indicated by the signal received.

A further embodiment of any of the foregoing systems, wherein the processor can be further configured to receive a signal indicative of altitude from an altitude sensor in communication with the processor, and to determine airspeed based on the acoustic waves detected and the altitude indicated by the signal received.

A further embodiment of any of the foregoing systems, wherein the one or more acoustic transducers and the processor comprise a backup system for determining airspeed and/or altitude. The system can further include a primary airspeed and/or altitude detector. The backup system can be used in response to a failure of the primary airspeed and/or altitude detector.

A further embodiment of any of the foregoing systems, wherein the primary airspeed and/or altitude detector can include a pneumatic air data sensor configured to sense airspeed and/or altitude of the aircraft and to generate the signal indicate of the airspeed and/or altitude sensed.

A further embodiment of any of the foregoing systems, wherein the primary airspeed and/or altitude detector can include a laser air data sensor configured to sense airspeed and/or altitude of the aircraft and to generate the signal indicate of the airspeed and/or altitude sensed.

A further embodiment of any of the foregoing systems, wherein the processor can be configured to determine both airspeed and altitude based on a relation between magnitude and frequency of the acoustic waves detected.

A further embodiment of any of the foregoing systems can further include an ultrasonic emitter configured to be attached to the exterior surface of the aircraft, the ultrasonic emitter configured to emit an ultrasonic signal into the airstream adjacent to the exterior surface of the aircraft. At least one of the one or more acoustic transducers can be further configured to detect the ultrasonic signal emitted.

A further embodiment of any of the foregoing systems, wherein the processor can be further configured to determine airspeed of the aircraft based on a time difference between an emission time corresponding to a time that the ultrasonic emitter emits the ultrasonic signal and a detection time corresponding to a time that one the at least one of the one or more ultrasonic transducers detects the ultrasonic signal emitted.

A further embodiment of any of the foregoing systems, wherein the one of more acoustic transducers can be configured to detect acoustic waves between 20 kHz and 100 kHz.

Some embodiments relate to a method for determining airspeed and/or altitude of an aircraft. The method includes detecting, via one of more acoustic transducers positioned along an exterior surface of an aircraft, acoustic waves caused by airflow relative to the exterior surface of the aircraft. The method also includes determining, via a processor, airspeed and/or altitude of the aircraft based, at least in part, on the acoustic waves detected.

The method of the preceding paragraph can optionally include, additionally and/or alternatively, any one or more of the following features, configurations and/or additional components:

A further embodiment of the foregoing method can further include receiving, via the processor, a signal indicative of airspeed from an airspeed sensor in communication with the processor. The method can also include determining, via the processor, altitude based on the acoustic waves detected and on the airspeed indicated by the signal received.

A further embodiment of any of the foregoing methods can further include receiving, via the processor, a signal indicative of altitude from an altitude sensor in communication with the processor. The method can also include determining, via the processor, airspeed based on the acoustic waves detected and on the altitude indicated by the signal received.

A further embodiment of any of the foregoing methods, wherein the one or more acoustic transducers and the processor can include a backup system for determining airspeed and/or altitude. The method can further include determining, via a primary airspeed and/or altitude detector, airspeed and/or altitude of an aircraft. The backup system can be used in response to a failure of the primary airspeed and/or altitude detector.

A further embodiment of any of the foregoing methods, wherein the primary airspeed and or altitude sensor comprises a pneumatic air data sensor. The method can further include sensing, via the pneumatic air data sensor, airspeed and/or altitude of the aircraft. The method can also include generating, via the pneumatic air date sensor, the signal indicative of the airspeed and/or altitude sensed.

A further embodiment of any of the foregoing methods, wherein the primary airspeed and or altitude sensor comprises a laser air data sensor. The method can further include sensing, via the laser air data sensor, airspeed and/or altitude of the aircraft. The method can further include generating, via the pneumatic air date sensor, the signal indicative of the airspeed and/or altitude sensed.

A further embodiment of any of the foregoing methods can further include determining, via the processor, both airspeed and altitude based on a relation between magnitude and frequency of the acoustic waves detected.

A further embodiment of any of the foregoing methods can further include emitting, via an ultrasonic emitter attached to the exterior surface of the aircraft, an ultrasonic signal into the airstream adjacent to the exterior surface of the aircraft. The method can also include detecting, via at least one of the one or more acoustic transducers, the ultrasonic signal emitted.

A further embodiment of any of the foregoing methods can further include determining, via the processor, airspeed of the aircraft based on a time difference between an emission time corresponding to a time that the ultrasonic emitter emits the ultrasonic signal and a detection time corresponding to a time that one the at least one of the one or more ultrasonic transducers detects the ultrasonic signal emitted.

A further embodiment of any of the foregoing methods, wherein the one of more acoustic transducers can be configured to detect acoustic waves between 20 kHz and 100 kHz.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining airspeed and/or altitude of an aircraft, the system comprising:
   one or more acoustic transducers positioned along an exterior surface of the aircraft, each of the one or more acoustic transducers being configured to detect acoustic waves caused by airflow relative to the exterior surface, the acoustic waves detected indicative of an airstream condition proximate the acoustic transducer; and
   a processor configured to determine airspeed and/or altitude of the aircraft based, at least in part, on the acoustic waves detected.

2. The system of claim 1, wherein the processor is further configured to receive a signal indicative of airspeed from an airspeed sensor in communication with the processor, and to determine altitude based on the acoustic waves detected and on the airspeed indicated by the signal received.

3. The system of claim 1, wherein the processor is further configured to receive a signal indicative of altitude from an altitude sensor in communication with the processor, and to determine airspeed based on the acoustic waves detected and the altitude indicated by the signal received.

4. The system of claim 1, wherein the one or more acoustic transducers and the processor comprise a backup system for determining airspeed and/or altitude, the system further comprising:
   a primary airspeed and/or altitude detector, wherein the backup system is used in response to a failure of the primary airspeed and/or altitude detector.

5. The system of claim 4, wherein the primary airspeed and/or altitude detector comprises:
a pneumatic air data sensor configured to sense airspeed and/or altitude of the aircraft and to generate the signal indicate of the airspeed and/or altitude sensed.

6. The system of claim 4, wherein the primary airspeed and/or altitude detector comprises:
a laser air data sensor configured to sense airspeed and/or altitude of the aircraft and to generate the signal indicate of the airspeed and/or altitude sensed.

7. The system of claim 1, wherein the processor is configured to determine both airspeed and altitude based on a relation between magnitude and frequency of the acoustic waves detected.

8. The system of claim 1, further comprising:
an ultrasonic emitter configured to be attached to the exterior surface of the aircraft, the ultrasonic emitter configured to emit an ultrasonic signal into the airstream adjacent to the exterior surface of the aircraft,
wherein at least one of the one or more acoustic transducers are further configured to detect the ultrasonic signal emitted.

9. The system of claim 8, wherein the processor is further configured to determine airspeed of the aircraft based on a time difference between an emission time corresponding to a time that the ultrasonic emitter emits the ultrasonic signal and a detection time corresponding to a time that one the at least one of the one or more ultrasonic transducers detects the ultrasonic signal emitted.

10. The system of claim 1, wherein the one of more acoustic transducers are configured to detect acoustic waves between 20 kHz and 100 kHz.

11. A method for determining airspeed and/or altitude of an aircraft, the method comprising:
detecting, via one of more acoustic transducers positioned along an exterior surface of an aircraft, acoustic waves caused by airflow relative to the exterior surface of the aircraft; and
determining, via a processor, airspeed and/or altitude of the aircraft based, at least in part, on the acoustic waves detected.

12. The method of claim 11, further comprising:
receiving, via the processor, a signal indicative of airspeed from an airspeed sensor in communication with the processor; and
determining, via the processor, altitude based on the acoustic waves detected and on the airspeed indicated by the signal received.

13. The method of claim 11, further comprising:
receiving, via the processor, a signal indicative of altitude from an altitude sensor in communication with the processor; and
determining, via the processor, airspeed based on the acoustic waves detected and on the altitude indicated by the signal received.

14. The method of claim 11, wherein the one or more acoustic transducers and the processor comprise a backup system for determining airspeed and/or altitude, the method further comprising:
determining, via a primary airspeed and/or altitude detector, airspeed and/or altitude of an aircraft,
wherein the backup system is used in response to a failure of the primary airspeed and/or altitude detector.

15. The method of claim 14, wherein the primary airspeed and or altitude sensor comprises a pneumatic air data sensor, the method further comprising:
sensing, via the pneumatic air data sensor, airspeed and/or altitude of the aircraft; and
generating, via the pneumatic air date sensor, the signal indicative of the airspeed and/or altitude sensed.

16. The method of claim 14, further comprising:
sensing, via a laser air data sensor, airspeed and/or altitude of the aircraft; and
generating, via a pneumatic air date sensor, the signal indicative of the airspeed and/or altitude sensed.

17. The method of claim 11, further comprising:
determining, via the processor, both airspeed and altitude based on a relation between magnitude and frequency of the acoustic waves detected.

18. The method of claim 11, further comprising:
emitting, via an ultrasonic emitter attached to the exterior surface of the aircraft, an ultrasonic signal into the airstream adjacent to the exterior surface of the aircraft; and
detecting, via at least one of the one or more acoustic transducers, the ultrasonic signal emitted.

19. The method of claim 18, further comprising:
determining, via the processor, airspeed of the aircraft based on a time difference between an emission time corresponding to a time that the ultrasonic emitter emits the ultrasonic signal and a detection time corresponding to a time that one the at least one of the one or more ultrasonic transducers detects the ultrasonic signal emitted.

20. The method of claim 11, wherein the one of more acoustic transducers are configured to detect acoustic waves between 20 kHz and 100 kHz.

* * * * *